United States Patent
Takahashi et al.

(10) Patent No.: US 8,042,516 B2
(45) Date of Patent: Oct. 25, 2011

(54) METHOD OF CONTROLLING VALVE TIMING OF DIESEL ENGINE

(75) Inventors: Takeshi Takahashi, Osaka (JP); Hidenori Nomura, Osaka (JP); Terumitsu Takahata, Osaka (JP); Kouji Shimizu, Osaka (JP); Takao Kawabe, Osaka (JP); Gou Asai, Osaka (JP); Yukihiro Shinohara, Kariya (JP); Tomoyuki Tsuda, Kariya (JP)

(73) Assignees: Yanmar Co., Ltd., Osaka (JP); Denso Corporation, Aichi (JP)

( * ) Notice: Subject to any disclaimer, the term of this patent is extended or adjusted under 35 U.S.C. 154(b) by 294 days.

(21) Appl. No.: 12/374,904

(22) PCT Filed: Jun. 5, 2007

(86) PCT No.: PCT/JP2007/061384
§ 371 (c)(1),
(2), (4) Date: Apr. 10, 2009

(87) PCT Pub. No.: WO2008/012992
PCT Pub. Date: Jan. 31, 2008

(65) Prior Publication Data
US 2009/0314264 A1    Dec. 24, 2009

(30) Foreign Application Priority Data
Jul. 25, 2006  (JP) .................... 2006-202572

(51) Int. Cl.
*F02D 13/02*   (2006.01)
*F02D 13/00*   (2006.01)

(52) U.S. Cl. .................. 123/348; 123/90.15
(58) Field of Classification Search .......... 123/90.15, 123/90.16, 90.17, 90.12, 345, 346, 347, 348, 123/295, 305, 568.11; 701/103
See application file for complete search history.

(56) References Cited

U.S. PATENT DOCUMENTS

| | | | |
|---|---|---|---|
| 6,848,422 B2 * | 2/2005 | Hashizume et al. | 123/406.29 |
| 7,000,380 B2 * | 2/2006 | Tokuyasu et al. | 60/285 |
| 7,089,908 B2 * | 8/2006 | Fujieda et al. | 123/299 |

FOREIGN PATENT DOCUMENTS

| | | |
|---|---|---|
| EP | 1 387 074 A | 2/2004 |
| EP | 1 484 494 A | 12/2004 |
| EP | 1 484 494 A2 | 12/2004 |
| JP | S45-17486 A | 6/1970 |

(Continued)

OTHER PUBLICATIONS

International Search Report for International Application No. PCT/JP2007/061384, Japanese Patent Office, mailed Jul. 31, 2007, 2 pgs.

(Continued)

*Primary Examiner* — Mahmoud Gimie
(74) *Attorney, Agent, or Firm* — Sterne, Kessler, Goldstein & Fox, P.L.L.C.

(57) ABSTRACT

In a diesel engine equipped with an injector 1 having a plurality of intersections between an axis line of the injector 1 and the axes of injection holes 10*a* bored in the injector 1, an air intake valve 25 is controlled so that it is closed at timing before a BDC (at timing when a piston comes to a bottom dead center) by an ECU 50, which controls the timing of closing the air intake valve 25 based on operating conditions of the engine.

7 Claims, 7 Drawing Sheets

FOREIGN PATENT DOCUMENTS

| | | |
|---|---|---|
| JP | S58-45953 U | 9/1981 |
| JP | 60-171958 | 11/1985 |
| JP | 08-074608 | 3/1996 |
| JP | 08-261111 | 10/1996 |
| JP | 09-042015 | 2/1997 |
| JP | 10-212910 | 8/1998 |
| JP | 10-325324 | 12/1998 |
| JP | 2000-179311 | 6/2000 |
| JP | 2002-188468 | 7/2002 |
| JP | 2002-188474 | 7/2002 |
| JP | 2003-090272 | 3/2003 |
| JP | 2004-360459 | 12/2004 |
| JP | 2005-155603 | 6/2005 |
| JP | 2006-070802 | 3/2006 |

OTHER PUBLICATIONS

Supplemental Search Report for European Appl. No. 07807736, European Patent Office, mailed Jan. 29, 2010, 2 pgs.

Hofbauer, Prof. P., "Variable valve actuation: new issues, solutions & technology," (online) Mar. 19, 2003, retrieved on Jul. 30, 2009 from URL: ftp://ftp.arb.ca.gov/carbis/cc/techsem/final_presentations/hofbauer_valveactuation.pdf.

English Translation of Office Action for Japanese Application No. JP2010-014085, Japanese Patent Office, drafted Sep. 7, 2010, 4 pages.

* cited by examiner (a)

(b)

(a)

(b)

METHOD OF CONTROLLING VALVE TIMING OF DIESEL ENGINE

BACKGROUND OF THE INVENTION

1. Field of the Invention

The present invention relates to a technique for controlling a valve timing of a diesel engine equipped with a common-rail fuel injection device, more specifically, a technique for controlling a valve timing suitable for a common-rail diesel engine, provided with a fuel injection device including an injector having a plurality of intersections between an axis line of the injector and the axes of injection holes bored in a nozzle body of the injector, or a group of injection holes.

2. Related Art

Conventionally, there is a well-known common-rail fuel injection device provided with a diesel engine. There is also a well-known concrete configuration of an injector injecting fuels supplied from the common-rail.

Moreover, an injector, which has a plurality of intersections between an axis line of the injector and the axes of injection holes bored in a nozzle body of the injector, i.e., which has a group of injection holes, is heretofore known.

The injector having a group of injection holes can have smaller injection holes than an injector having the same amount of injection quantity without a group of injection holes. Therefore, it is noted that the injector having a group of injection holes enables injected fuels to be atomized and diffused over a wider range, compared to the injector without a group of injection holes, thereby improving an ignition performance and securing a low combustion noise and good combustion state, even when the engine is cool and low cetane value fuels are used.

It is also known that the injector having a group of injection holes is effective as a means for cleaning up an exhaust gas since it enables total hydrocarbons (THC) and particulate matters (PM) contained in the exhaust gas to be reduced. For example, JP 2006-70802 discloses the above-mentioned technique.

However, it is proved from experimental results that nitrogen oxides (NOx) or smokes in the exhaust gas are increased, due to increases of intake temperature and fuel temperature, or an increase to a high cetane value of the fuels.

Consequently, when so-called intake temperature correcting control is performed, a range of reduction in fuel injection quantity must be increased, with increase in the intake temperature, thereby lowering torque and causing a problem in engine performance.

Although it is effective to lower the intake temperature so as to inhibit NOx or smokes, there is a limitation of cooling capacity in an air system, and there is a limitation of cooling capacity, depending on an intercooler capacity even in a water-cooling system. Considering tighter control on exhaust emissions in the future, measures to increase the capacity of the intercooler may be taken, but additional measures exist to inhibit NOx or smokes, since service conditions thereof remain to be limited due to the limitation of installation location and cost phase thereof.

In other words, in a conventional art, it was difficult to put to practical use an engine equipped with an injector, which reaches the environmental standard value (regulation value) and has a group of injection holes.

Technologies that reduce NOx by delaying a peak of combustion so as to lower the combustion temperature by means of injection timing delaying are well-known, but they effect fuel consumption due to the deterioration of combustion efficiency, whereby there still remain problems/limitations such as limitation of delaying or the like.

Previously, as an effective means for lowering the intake temperature, a technology which controls valve timing of the engine and delays a timing of closing the air intake valve so as to drive an engine through a high expansion ratio cycle (so-called miller cycle), in which the expansion ratio is higher than a compression ratio, has been heretofore known.

It is known that when the engine is driven in the miller cycle, an intake temperature in a cylinder can be lowered and a combustion temperature can be lowered, due to the effect of intake air adiabatic expansion. For example, JP 2004-360459 discloses this technology.

SUMMARY OF THE INVENTION

Accordingly, in consideration to the above-discussed problems, it is an object of the present invention to provide a diesel engine that cleans up the exhaust gas and realizes a superior combustion efficiency, so as to maintain an effectiveness of the injector having a group of injection holes and solves problems facing the injector having a group of injection holes by means of valve timing control.

The problem so as to be solved by the present invention is as mentioned above. Next, the means of solving the problem will be described. In a method for controlling a valve timing of a diesel engine according to the present invention, in a common-rail diesel engine equipped with a fuel injection device including an injector having a plurality of intersections between an axis line of the injector and the axes of injection holes bored in the injector, comprising a step of controlling the air intake valve so that it is closed at timing before a piston in a cylinder performing a fuel injection comes to a bottom dead center, in accordance with an engine rotation number or a load, by a control means for controlling the timing of closing the air intake valve, based on operating conditions of the engine.

In a method for controlling the valve timing of the diesel engine according to the present invention, the timings of opening and closing the air intake valve can be changed by an actuator, which is connected to the control means, so as to control the timing of closing the air intake valve.

In a method for controlling the valve timing of the diesel engine to the according to the present invention, the timing of closing the air intake valve is controlled on the basis of recirculation volume of exhaust gas by the control means, which is connected to an exhaust gas recirculation device.

In a method for controlling the valve timing of the diesel engine according to the present invention, the timing of closing the air intake valve is controlled on the basis of an intake volume or an air volume displacement, by the control means, which is connected to an intake volume detecting means or an air volume displacement detecting means, and which preliminarily memorizes a map information corresponding to the intake volume or the air volume displacement.

In a method for controlling the valve timing of the diesel engine according to the present invention, each of a plurality of the air intake valves per single cylinder is controlled so that it is closed at a different timing by the control means.

In a method for controlling the valve timing of the diesel engine according to the present invention, when the timing of closing the air intake valve is accelerated by the control means that connects a variable means of a swirl ratio, the variable means is controlled to increase the swirl ratio.

In a method for controlling the valve timing of the diesel engine according to the present invention, the timing of closing the air intake valve is controlled in accordance with a charging pressure by the control means that connects a charging pressure detecting means.

In a method for controlling the valve timing of the diesel engine according to the present invention, the timing of closing the air intake valve is controlled in accordance with an intake temperature by the control means that connects an intake temperature detecting means.

In a method for controlling the valve timing of the diesel engine according to the present invention, the timing of closing the air intake valve is controlled in accordance with a fuel temperature by the control means that connects a fuel temperature detecting means.

In a method for controlling the valve timing of the diesel engine according to the present invention, the timing of closing the air intake valve is controlled in accordance with a fuel cetane value by the control means that connects a fuel cetane value input means or a fuel cetane value detecting means In a method for controlling the valve timing of the diesel engine according to the present invention, the air intake valve is controlled so that it is closed at timing after the piston in the cylinder performing the fuel injection comes to the bottom dead center in accordance with the detection values by inputting to the control means any of a detection value of the charging pressure by the charging pressure detecting means, a detection value of the intake temperature by the intake temperature detecting means or a detection value of the fuel temperature by the fuel temperature detecting means, or alternatively, any two of combination of the charging pressure, the intake temperature and the fuel temperature, or three detection value of them.

The present invention shows the following effects.

In a method for controlling a valve timing of a diesel engine according to the present invention, in a common-rail diesel engine equipped with a fuel injection device including an injector having a plurality of intersections between an axis line of the injector and the axes of injection holes bored in the injector, comprising a step of controlling an air intake valve so that it is closed at timing before BDC (when a piston comes to a bottom dead center), in accordance with an engine rotation number or an load by a control means for controlling a timing of closing an air intake valve, based on operating conditions of the engine, thereby lowering an intake temperature in a cylinder and lowering a combustion temperature, due to the effect of intake air adiabatic expansion.

In the method for controlling the valve timing of the diesel engine according to the present invention, the timings of opening and closing the air intake valve can be changed by an actuator, which is connected to the control means, so as to control the timing of closing the air intake valve, thereby performing accurate and detailed valve timing control, in accordance with operation conditions of the engine.

In a method for controlling the valve timing of the diesel engine according to the present invention, the timing of closing the air intake valve is controlled on the basis of recirculation volume of exhaust gas by the control means, which is connected to an exhaust gas recirculation device, thereby feeding back the intake temperature change by the EGR to the control means, so as to perform an adequate valve timing control.

In a method for controlling the valve timing of the diesel engine according to the present invention, the timing of closing the air intake valve is controlled on the basis of an intake volume or an air volume displacement, by the control means, which is connected to an intake volume detecting means or an air volume displacement detecting means, and which preliminarily memorizes a map information corresponding to the intake volume or the air volume displacement, thereby feeding back the intake volume to the control means, so as to perform an adequate valve timing control.

In a method for controlling the valve timing of the diesel engine according to the present invention, each of a plurality of the air intake valves per single cylinder is controlled so that it is closed at a different timing by the control means, thereby expanding the timing when the effect of intake air adiabatic expansion is acquired, and performing a detailed valve timing control.

In a method for controlling the valve timing of the diesel engine according to the present invention, when the timing of closing the air intake valve is accelerated by the control means that connects a variable means of a swirl ratio, the variable means is controlled to increase the swirl ratio, thereby increasing the swirl ratio, with increase in the intake air adiabatic expansion quantity, so as to further improve the combustion efficiency.

In a method for controlling the valve timing of the diesel engine according to the present invention, the timing of closing the air intake valve is controlled in accordance with a charging pressure by the control means that connects a charging pressure detecting means, thereby relating the intake air adiabatic expansion quantity to the charging pressure, so as to perform an adequate valve timing control.

In a method for controlling the valve timing of the diesel engine according to the present invention, the timing of closing the air intake valve is controlled in accordance with an intake temperature by the control means that connects an intake temperature detecting means, thereby relating the intake air adiabatic expansion quantity to the intake temperature, so as to perform an adequate valve timing control.

In a method for controlling the valve timing of the diesel engine according to the present invention, the timing of closing the air intake valve is controlled in accordance with a fuel temperature by the control means that connects a fuel temperature detecting means, thereby relating the intake air adiabatic expansion quantity to the fuel temperature, so as to perform an adequate valve timing control.

In a method for controlling the valve timing of the diesel engine according to the present invention, the timing of closing the air intake valve is controlled in accordance with a fuel cetane value by the control means that connects a fuel cetane value input means or a fuel cetane value detecting means, thereby relating the intake air adiabatic expansion quantity to the fuel cetane value, so as to perform an adequate valve timing control.

In a method for controlling the valve timing of the diesel engine according to the present invention, the air intake valve is controlled so that it is closed at timing after the BDC (when the piston comes to the bottom dead center) in accordance with the detection values, by inputting to the control means, any of a detection value of the charging pressure by the charging pressure detecting means, a detection value of the intake temperature by the intake temperature detecting means or a detection value of the fuel temperature by the fuel temperature detecting means, or alternatively, any two of combination of the charging pressure, the intake temperature and the fuel temperature, or three detection value of them, thereby canceling the valve timing control and automatically switching it to a normal control, during the operating conditions that are not suitable for the valve timing control.

DETAILED DESCRIPTION OF THE INVENTION

Next, embodiments of the present invention will be described.

Figure 1:
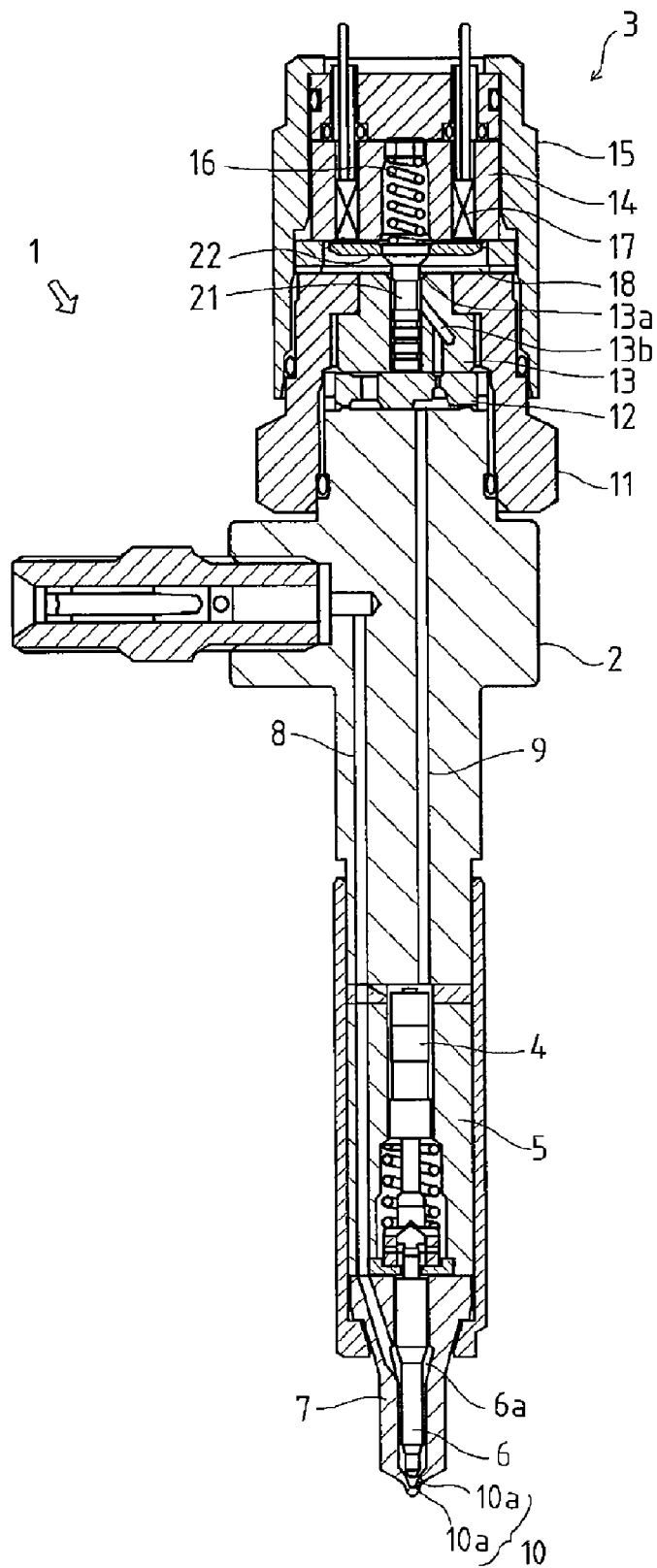
FIG. 1 is a side view of an entire construction of an injector according to an embodiment of the present invention.

FIG. 1 is a side view of an entire construction of an injector according to an embodiment of the present invention.

Figure 2:
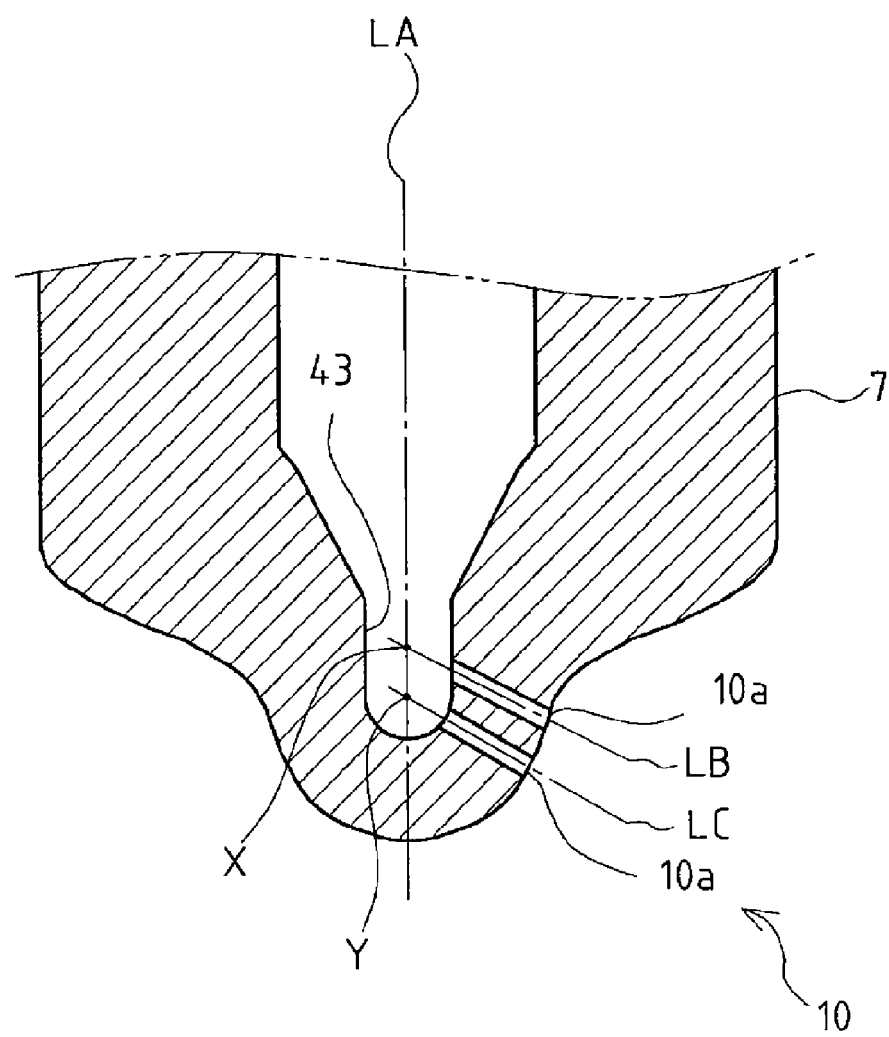
FIG. 2 is a side view of a detailed construction of a group of injection holes according to an embodiment of the present invention.

FIG. 2 is a side view of a detailed construction of a group of injection holes according to an embodiment of the present invention.

Figure 3:
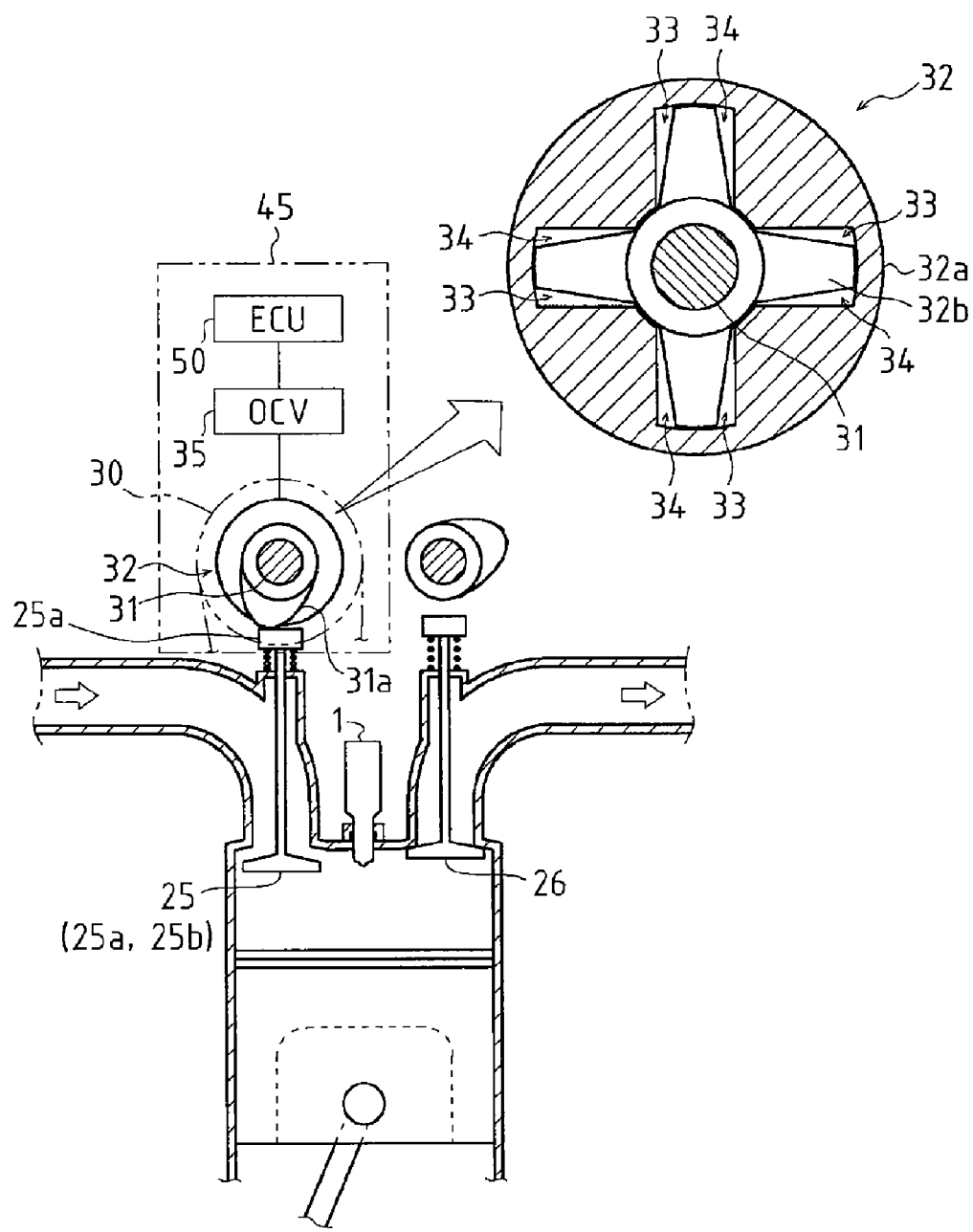
FIG. 3 is a pattern diagram of a construction of valve timing control mechanism according to an embodiment of the present invention.

FIG. 3 is a pattern diagram of a construction of valve timing control mechanism according to an embodiment of the present invention.

Figure 4:
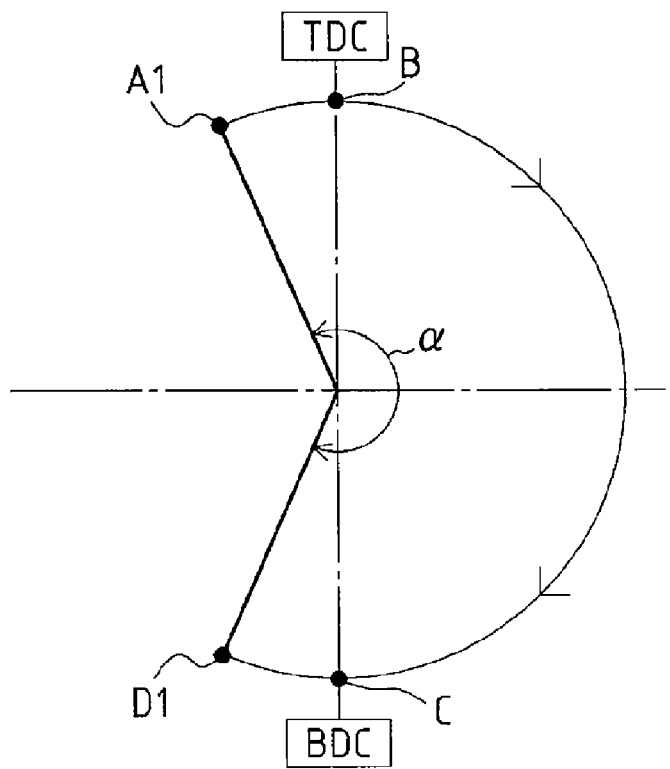
FIG. 4 is a diagram showing a relationship between a crankshaft angle and a timing of closing an air intake valve in the case of single air intake valve.
Figure 4:
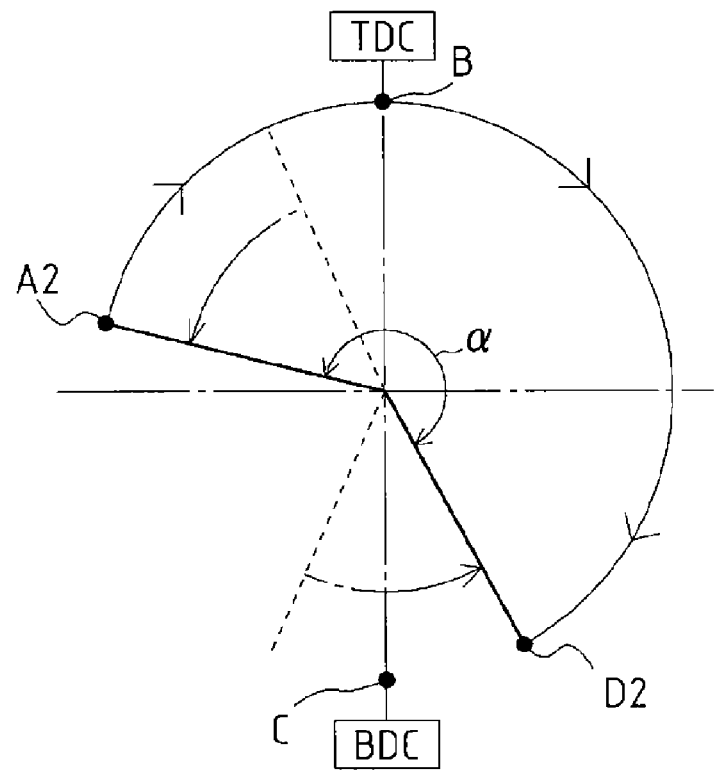

FIG. 4 is a diagram showing a relationship between a crankshaft angle and a timing of closing an air intake valve in the case of single air intake valve.

Figure 5:
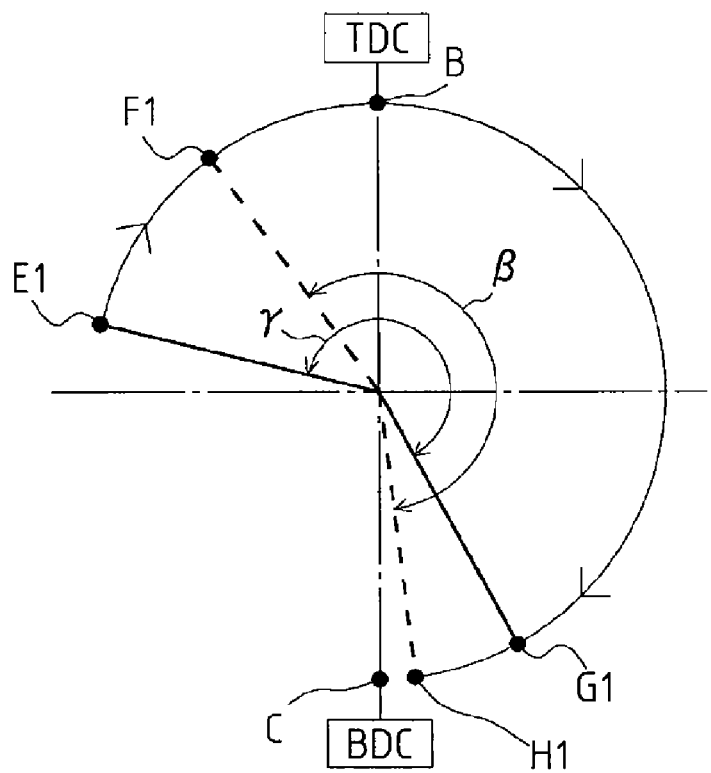
FIG. 5 is diagram showing a relationship between a crankshaft angle and a timing of closing an air intake valve in the case of two air intake valves.
Figure 5:
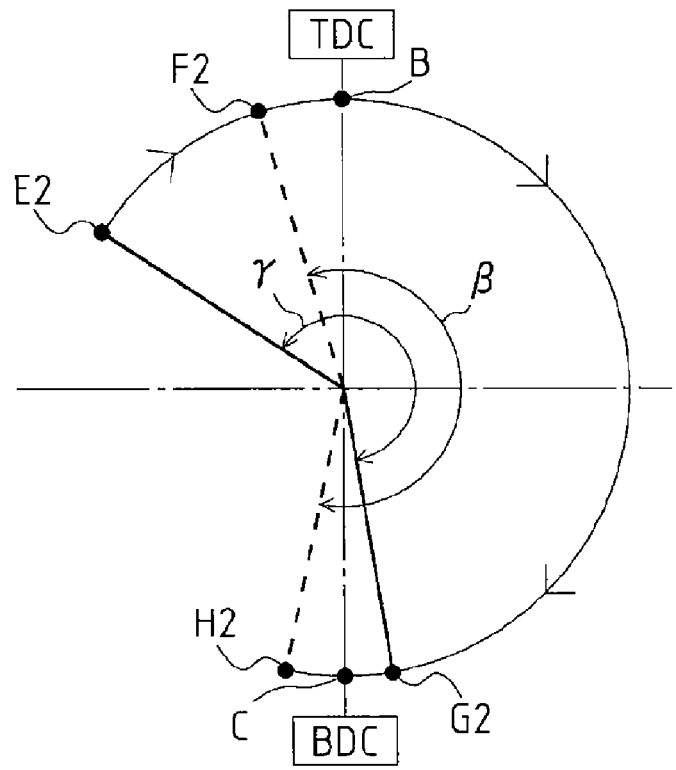

FIG. 5 is diagram showing a relationship between a crankshaft angle and a timing of closing an air intake valve in the case of two air intake valves.

Figure 6:
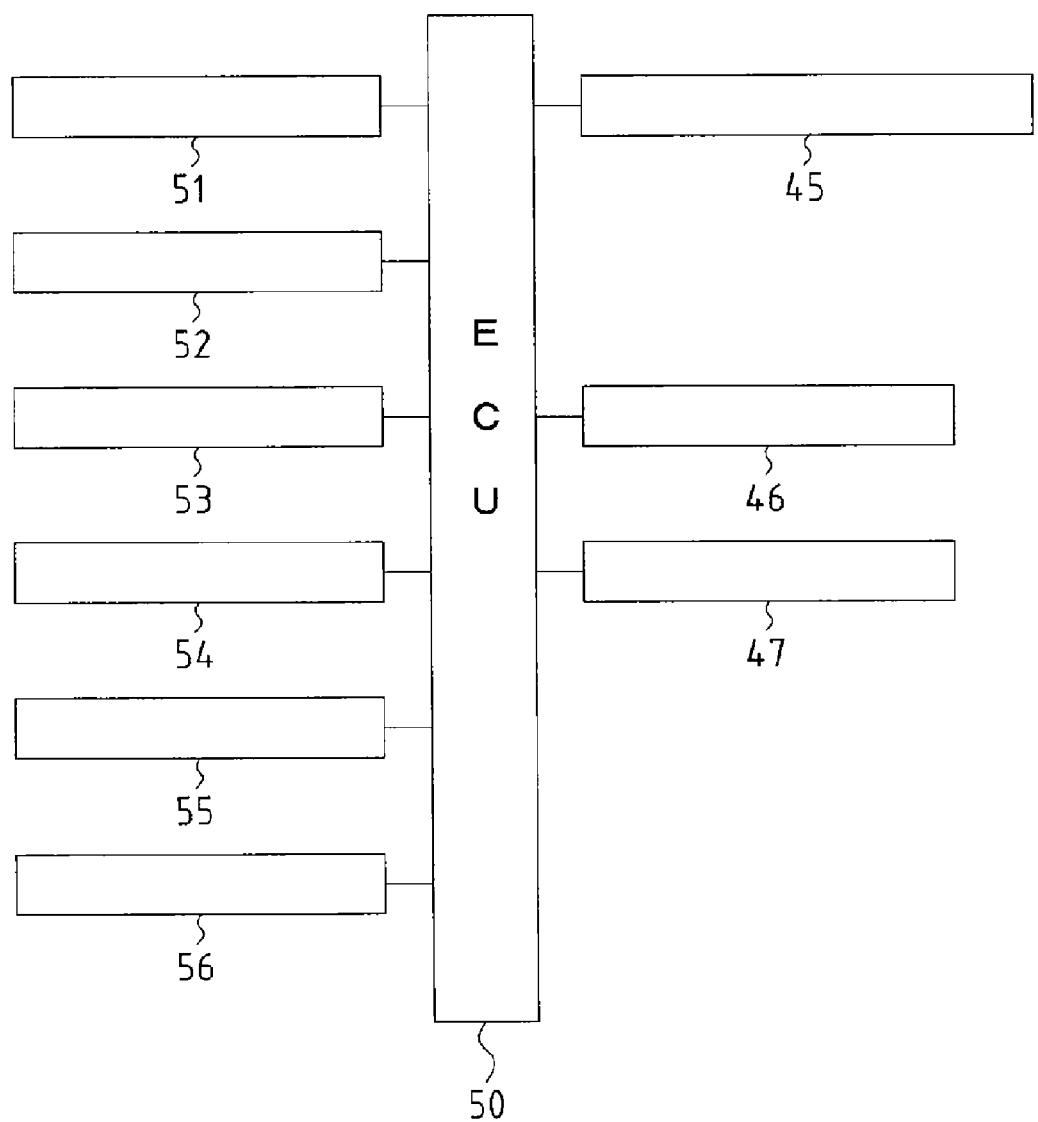
FIG. 6 is a pattern diagram showing a construction of a control device according to an embodiment of the present invention.

FIG. 6 is a pattern diagram showing a construction of a control device according to an embodiment of the present invention.

Figure 7:
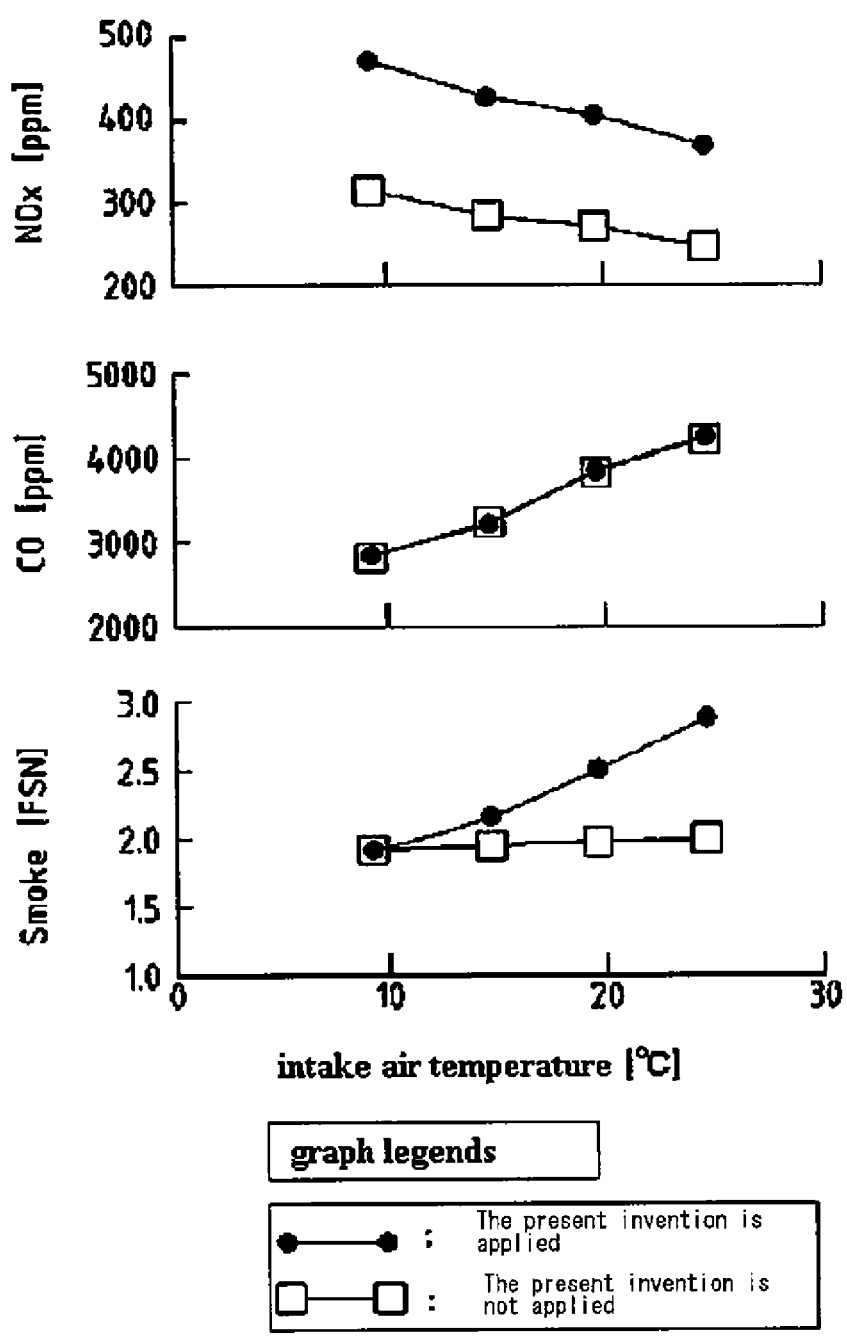
FIG. 7 is a diagram showing relationships between the intake temperature and the respective concentrations of smokes, carbon monoxide and nitrogen oxide.

FIG. 7 is a diagram showing relationships between the intake temperature and the respective concentrations of smokes, carbon monoxide and nitrogen oxide.

As shown in FIG. 1, an injector 1 includes an injector body 2, a solenoid valve 3, a command piston body 5 and a nozzle body 7. The solenoid valve 3, which is provided on the upper portion of the injector body 2, controls a back pressure of a command piston 4 so as to control a fuel injection. The command piston body 5, which is provided on the lower portion of the injector body 2, is slidably provided therein with the command piston 4. The nozzle body 7, which is provided on the lower portion of the command piston body 5, is slidably provided therein with a needle valve 6. Due to the above construction, the injector 1 is set up to inject high-pressure fuels, which is supplied from a common rail (not shown) to a fuel supplier 8, through injection holes 10a provided at the end portion of the nozzle body 7.

As shown FIG. 1, in the solenoid valve 3, an orifice plate 12 and a valve sheet 13 are integrated with the injector body 2 by a valve holding member 11, and a cap 15, in which a solenoid core 14 is disposed in the valve holding member 11, is fixed on the injector body 2. An axial valve disc 21 is vertically, slidably provided with the valve sheet 13. The valve disc 21 is constantly biased downwardly by an elastic force of a spring 16 internally provided in a spring chamber 14s of the solenoid core 14, and the valve disc sheet surface 21a is attached to the valve sheet surface 13a of the valve sheet 13, so as to prevent flowing out of the fuels from a high-pressure oil passage 13b to a low-pressure fuel chamber 18, thereby securing the back pressure of the command piston 4 through a controlling oil passage 9. Accordingly, the command piston 4 is moved downwardly by the back pressure and presses downwardly the needle valve 6, thereby limiting the fuel injection.

An armature 22 is fixed on the upper side of the valve disc 21.

The armature 22 is vertically, movably disposed in the low-pressure fuel chamber 18 formed between the solenoid core 14 and the valve sheet 13.

When a solenoid coil 17 is energized, the armature 22 is moved upwardly with the valve disc 21, the valve disc sheet surface 21a is detached from the valve sheet surface 13a and the fuels in the high-pressure oil passage 13b are flowed out to the low-pressure fuel chamber 18. Accordingly, the high-pressure fuels in the controlling oil passage 9 are flowed out to the low-pressure fuel chamber 18, and the back pressure of the command piston 4 is decreased. Then, the needle valve 6 is lifted by the high-pressure fuels supplied in the nozzle fuel chamber 6a, thereby injecting the fuel.

As described above, the armature 22 is moved in the low-pressure fuel chamber 18 between the solenoid core 14 and the valve sheet 13, thereby limiting the flow of the fuels for the injection control by the valve disc 21 integral with the armature 22, so as to control the fuel injection.

As mentioned above, the entire construction of the injection as a major portion of the present invention was described.

Next, a construction of a group of injection holes according to an embodiment of the present invention will be described with reference to FIG. 2.

As shown in FIG. 2, the injector 1 according to an embodiment of the present invention includes a group of injection holes 10.

The group of injection holes 10 is configured to form a plurality of injection holes 10a having respective different axis lines to the axis direction, on a plane surface including an axis line of the nozzle body 7 (i.e., an axis line of the injector 1).

In other words, the injection holes 10a are disposed so that a plurality of intersections (the intersections X and Y) between the axis line (the axis line LA) of the nozzle body 7 and the axes (the axis line LB and LC) of the injection holes 10a are present in the axis direction of the nozzle body 7.

Incidentally, in the present embodiment, an example, in which two points of intersections between the axis line of the nozzle body 7 and the axes of the injection holes 10a are present in the axis direction, is provided without limitation, but three or more points of intersections may be present.

In FIG. 2, the group of injection holes 10 on any cross section is shown, but a plurality of group of injection holes 10 are radially disposed at even intervals centered around the axis line of the nozzle body 7, as an entire construction of the nozzle body 7.

Incidentally, in the present invention, the injection holes 10a are set up to communicate with a sack 43 but not limited to the construction.

As mentioned above, the construction of the group of injection holes according to an embodiment of the present invention was described.

Next, an entire construction of a valve timing control mechanism will be described with reference to FIG. 3.

As shown in FIG. 3, a valve timing control mechanism 45 includes a sprocket 30, a camshaft 31 and VTC (Valve Timing Controller) 32 and the like. The sprocket 30, which is connected to a drive shaft of an engine (not shown), is driven by rotation of the drive shaft. The camshaft 31 is driven by a rotation of the sprocket 30. The VTC 32, which is interposed between the sprocket 30 and the camshaft 31, can change a relative phase between the sprocket 30 and the camshaft 31 by a hydraulic pressure.

The VTC 32 is a kind of hydraulic actuator, which mainly includes a VTC housing 32a and a drive plate 32b.

The camshaft 31 penetrated onto a shaft center of the VTC housing 32a and the VTC housing 32a is rotatably supported on the camshaft 31. The sprocket 30 is externally attached onto the VTC housing 32a so as to integrally constitute the VTC housing 32a and the sprocket 30. The drive plate 32b is internally attached to the VTC housing 32a, and the drive plate 32b is relatively unrotatably supported on the camshaft 31 penetrating into the shaft center of the VTC housing 32a. A space, which is formed by an inner circumference surface of the VTC housing 32a and an outer circumference surface of the drive plate 32b, is defined as a first oil chamber 33 and a second oil chamber 34, and the VTC housing 32a is reciprocated by adjusting a hydraulic balance of a hydraulic oil supplied to the first oil chamber 33 and a second oil chamber 34.

The relative phase between the sprocket 30 and the camshaft 31 is changed by changing the valve opening degree of an OCV (Oil Control Valve) 35 in response to a control signal from a ECU 50 and by adjusting a hydraulic balance of a hydraulic oil supplied to the first oil chamber 33 and a second oil chamber 34.

Accordingly, the timing, when the cam 31a fixed on the camshaft 31 and a valve head 25c of an air intake valve 25 are attached to each other, is changed, so as to adjust the timing of closing the air intake valve 25.

Incidentally, in the present embodiment, timings of opening and closing an exhaust valve 26 are kept constant, but the valve timing control mechanism 45 may be also applicable to the exhaust valve 26.

In other words, the valve timing control mechanism 45 is constituted so that timings of opening and closing the air intake valve (the valve timing) can be changed by the hydraulic actuator and the like, comprising of the hydraulic actuator and the ECU 50 connected to each other.

Incidentally, in the present embodiment, as an example, the valve timing control mechanism using the VTC is described, but, for example, the mechanism may be comprised of a rocker arm so as to open and close the air intake valve, multiple cams corresponding to the load, provided at every air intake valve, a hydraulic actuator switching the cams driving the rocker arm in response to the load, and the like. In the mechanism, a cam profile of the cam may be sterically constituted, and the actuator may be electrically switched, but the valve timing control mechanism applied to the present invention is not limited to the above construction.

As described above, the entire construction of the valve timing control mechanism was described.

Next, a timing of closing the air intake valve according to an embodiment of the present invention will be described with reference to FIGS. 4 and 5.

As shown in FIG. 4(a), a valve timing of a commonly-used engine controls the timing as the basis for a phase of a crankshaft, and the valve timing is generally controlled so that the air intake valve 25 is "open" at timing before the TDC (i.e., the point B) (for example, at timing of the point A1) and the air intake valve 25 is "closed" at timing after the BDC (i.e., the point C) (for example, at timing of the D1). In this case, a phase difference between the "opening" and the "closing" of the air intake valve 25 is held at a constant phase angle α shown in FIGS. 4 (a), (b).

Meanwhile, as shown in FIG. 4 (b), the valve timing according to an embodiment of the present invention controls the timing, so that the timing of "opening" the air intake valve 25 is, for example, that of the point A2, and the timing of "closing" the air intake valve 25 is that before the BDC (e.g., the timing of the point D2), by accelerating the timings of opening and closing the valve, on the condition that the phase angle α between the "opening" and the "closing" of the air intake valve 25 is held.

Thus, when the timing of closing the air intake valve 25 is that before the BDC (i.e., the timing of the point D2), as intake strokes are continued until the piston comes to the bottom dead center, even after closing the valve, the air breathed in the cylinder is expanded (adiabatically expanded) through the air tight condition, thereby lowering the intake temperature in the cylinder.

Also, due to the lowering of the intake temperature in the cylinder, the combustion temperature in the cylinder during the combustion time is lowered, thereby reducing NOx and smokes.

As shown in FIG. 5 (a), when the present invention is applied to an engine having two air intake valves, both of the air intake valves (i.e., a first air intake valve 25a and a second air intake valve 25b) are "opened" at timing before the TDC (i.e., the timing of the point B) (for example, the timing of the points E1 and F1), and the first air intake valve 25a is "closed" at timing after the BDC (i.e., the timing of the point C) (for example, the timing of the point H1), as well as the second air intake valve 25b is "closed" at timing before the BDC (for example, the timing of the point G1). In this case, a phase difference between the "opening" and the "closing" of the first air intake valve 25a is defined as a phase angle β in FIG. 5 (a), and a phase difference between the "opening" and the "closing" of the second air intake valve 25b is defined as a phase angle γ in FIG. 5 (a).

In this regard, as shown in FIG. 5 (b), when the present invention is applied to the engine having two air intake valves, one of the timings of closing the first air intake valve 25a and the second air intake valve 25b need not necessarily to be before the BDC, the other after the BDC, and the timings of closing both of the air intake valves (i.e., the first air intake valve 25a and the second intake valve 25b) may be those before the BDC (for example, the timings of the points G2 and H2). In this case, a phase difference, between the timing of "opening" (i.e., the timing of the point F2) and that of "closing" (i.e., the timing of the point H2) of the first air intake valve 25a, is held at the phase angle β in FIG. 5 (a). A phase difference, between the timing of "opening" (i.e., the timing of the point E2) and that of "closing" (i.e., the timing of the point G2) of the second air intake valve 25b, is held at the phase angle γ in FIG. 5 (a).

The timings of closing the first air intake valve 25a and the second air intake valve 25b can be controlled regardless of before and after the BDC, thereby expanding the adjusting range of the adiabatic expansion quantity and finely adjusting the adiabatic expansion quantity.

Incidentally, in the present embodiment, an example of one or two air intake valve is described, but the number of the air intake valve is not limited to it. When three or more air intake valves are used, the adjusting range of the adiabatic expansion quantity can be further expanded and the adiabatic expansion quantity can be more finely adjusted.

Accordingly, problems such as a supercooling of the intake air and a lack of the intake air volume can be solved and the intake temperature can be adequately adjusted, thereby solving the problems facing the injector having a group of injection holes.

More specifically, the effectiveness of the injector having a group of injection holes, wherein an ignition performance can be improved and low combustion noise, good combustion state can be secured, are maintained, even when the engine is cool or fuels having low cetane value are used, and the problems of the injector having a group of injection holes, wherein nitrogen oxide (NOx) and smokes in the exhaust gas are increased, due to the increase in the intake temperature, are solved.

As described above, the timing of closing the air intake valve according to an embodiment of the present invention was described.

Next, a valve timing control of an air intake valve according to an embodiment of the present invention will be described with reference to FIG. 6.

As shown in FIG. 6, an ECU 50 is provided as a control means, so as to realize the valve timing control on the air intake valve according to the embodiment of the present invention.

The ECU 50 includes a CPU, a RAM and the like, and has an arithmetic processing function, which calculates optimal operating conditions, a memory function, which memorizes a predefined service conditions (the map information and so on).

The ECU 50 is connected to various sensors in order to detect the operating conditions of the engine, such as an air flow meter 51, a supercharger rotation number sensor 52, a charging pressure sensor 53, an intake temperature sensor 54 and a fuel temperature sensor 55 and the like, as well as a fuel cetane value input portion 56. Various signals showing the operating conditions of the engine (the rotation number or the load) and the service conditions are input to the ECU 50, and the ECU 50 performs the arithmetic processing on the basis of the signals. In this regard, the cetane value can be calculated by detecting an angular velocity of a crank angle and calculating an amplitude of the angular velocity, and the cetane value, which is obtained from the angular velocity or other sensors or the like, may be available in an after-mentioned valve timing control. The ECU 50 connects devices, such as a valve timing control mechanism 45, an EGR valve 46, a swirl variable valve 47 and the like.

The ECU 50 issues control signals to devices such as the valve timing control mechanism 45, the EGR valve 46, the swirl variable valve 47 and the like, on the basis of the results of the arithmetic processing, thereby being electrically controlled so as to optimally maintain operation conditions of the engine.

The EGR (Exhaust Gas Recirculation) is a device that reduces NOx into the exhaust gas by recirculating a part of the exhaust gas in a combustion chamber and by combusting the intake air with an oxygen concentration lowered, as an air-fuel mixture of an inhaled ambient air and the exhaust gas, so as to slow the combustion and lower the combustion temperature.

Because the intake temperature increases with increase in the EGR quantity (i.e., a recirculation volume of the exhaust gas), there is a correlation between the EGR quantity and the timing of closing the air intake valve.

Consequently, in the present invention, the intake temperature can be varied by feeding back the EGR quantity from the EGR valve 46 to the ECU 50 and by controlling the valve timing control mechanism 45 corresponding to change in the EGR quantity, so as to adjusting the adiabatic expansion quantity.

Incidentally, various systems of EGR are heretofore known, but any system can be applicable in the present invention, regardless of formalities of the systems.

There is heretofore known a swirl variable valve, as the swirl variable valve 47, that include, for example, a flap valve disc provided in the intake port, driving members such as an actuator provided outside of the intake port or the like, wherein an axis portion which journals the valve disc is penetrated from inside the intake port to outside thereof, and the axis portion connects the driving member via a linkage and so on, so that the valve disc is opened and closed in the intake port in accordance with working conditions of the driving members.

The swirl variable valve is set up to change the swirl ratio of the inhaled ambient air in the combustion chamber by opening and closing the valve disc so as to change a flow passage area of the intake port.

It is proved from experimental results and the like that when the intake temperature is low and the combustion temperature is low, the combustion state is improved by increasing the swirl ratio of the inhaled ambient air.

Consequently, in the present invention, with increase in the intake air adiabatic expansion quantity, i.e., in response to the power increase in the control signal from the ECU 50 to the valve timing control mechanism 45, the control signal from the ECU 50 to the swirl variable valve 47 is output, so as to increase the swirl ratio, thereby controlling the swirl variable valve 47.

Accordingly, the effectiveness of the injector having a group of injection holes can be further enhanced and the combustion state can be improved.

The air flow meter 51 is a sensor that detects the intake volume introduced in the cylinder. The ECU 50 preliminary memorizes the timing of closing the air intake valve corresponding to the intake volume as a map information, and the ECU 50 outputs the control signal based on the map information to the valve timing control mechanism 45 by feeding back the signal that detected the intake volume to the ECU 50, thereby controlling the timing of closing the air intake valve.

Alternatively, the ECU 50 memorizes the timing of closing the air intake valve corresponding to an air volume displacement as a map information, by detecting the air volume displacement of the engine, using the supercharger rotation number sensor 52, instead of the air flow meter 51, thereby controlling the valve timing control mechanism 45.

The charging pressure sensor 53 is a sensor that detects a charging pressure of a supercharger. Generally, it is noted that there is a correlation between the charging pressure and the timing of closing the air intake valve, as the intake temperature increases due to the increase in the charging pressure.

Therefore, in the present invention, the signal of the charging pressure detected by the charging pressure sensor 53 is fed back to the ECU 50, and the valve timing control mechanism 45 is controlled to correspond to the change of the charging pressure, thereby adjusting the adiabatic expansion quantity so as to vary the air intake temperature.

Meanwhile, when the charging pressure is low and the combustion temperature is in a supercooled state by performing the valve timing control, leading to the deterioration of the combustion state, the valve timing control is canceled in accordance with the change of the charging pressure, based on the computational decisions by the ECU 50, thereby returning to a normal intake valve timing or delaying the timing of closing the valve to the BDC.

When the combustion state may be deteriorated, by comprehensively evaluating not only the charging pressure but also a combination of the intake temperature, the combustion temperature and the charging pressure, based on the computational decisions by the ECU 50, the valve timing control is canceled, thereby returning to a normal intake valve timing or delaying the timing of closing the valve to the BDC.

The intake temperature sensor 54 is a sensor that detects a temperature of inhaled ambient air introduced into the cylinder.

Because the inhaled ambient air temperature is directly correlated with the intake temperature, the signal of the inhaled ambient air temperature detected by the intake temperature sensor 54 is fed back to the ECU 50, and the valve timing control mechanism 45 is proportionally-controlled, in proportion to the change of the inhaled ambient air temperature, thereby adjusting the adiabatic expansion quantity so as to vary the air intake temperature.

Meanwhile, when the inhaled ambient air temperature is low and the combustion temperature is in a supercooled state by performing the valve timing control, leading to the deterioration of the combustion state, the valve timing control is canceled in accordance with the change of the inhaled ambient air temperature, based on the computational decisions by the ECU 50, thereby returning to a normal intake valve timing or delaying the timing of closing the valve to the BDC.

The fuel temperature sensor 55 is a sensor that detects a temperature of the fuels injected into the cylinder.

Because the fuel temperature is correlated with the combustion temperature, the signal of the fuel temperature detected by the fuel temperature sensor 55 is fed back to the ECU 50, and the valve timing control mechanism 45 is controlled, in accordance with the change of the fuel temperature, thereby adjusting the adiabatic expansion quantity so as to vary the air intake temperature.

Meanwhile, when the fuel temperature is low and the combustion temperature is in a supercooled state by performing the valve timing control, leading to the deterioration of the combustion state, the valve timing control is canceled in accordance with the change of the fuel temperature, based on the computational decisions by the ECU 50, thereby returning to a normal intake valve timing or delaying the timing of closing the valve to the BDC.

The fuel cetane value input portion 56 is a means for inputting a cetane value of the fuels used into the ECU 50 and memorizing it as a service condition and includes a display and a numeric keypad and the like. The cetane values of the fuels available from around the world are widely variable, but the fuel cetane value is correlated with the combustion temperature.

Therefore, in the present invention, the fuel cetane value used for practical purposes is input into the ECU 50 as the service condition or alternatively, a detected value is input into the ECU 50 and memorized, and the valve timing control mechanism 45 is controlled in accordance with the fuel cetane value, thereby adjusting the adiabatic expansion quantity so as to vary the air intake temperature.

As described above, the valve timing control on the air intake valve according to an embodiment of the present invention was described.

Next, application effects of the present invention will be described with reference to FIG. 7.

FIG. 7 shows experimentally ascertained data on the changes of the respective concentrations of smokes, CO (carbon monoxide) and NOx (nitrogen oxide) in the exhaust air, due to the change of the intake air temperature in the respective conditions at the time when the present invention is applied and not applied.

The injector having a group of injection holes had a problem of increasing in smoke with increase in the intake air temperature, but, after the time of application of the present invention, the increase in smoke is inhibited, even when the intake air temperature increases from about 10 degrees C. to about 25 degrees C. In other words, when the intake air temperature is in a practicable area by application of the present invention, the problem of increasing smoke in the exhaust gas due to the change in the intake air temperature, facing the injector having a group of injection holes, can be solved.

Though the injector having a group of injection holes causes the problem of increasing NOx, the amount of NOx generation is reduced up to about two thirds, compared to that at the inapplicable time of the present invention. In other words, when the intake air temperature is in a practicable area by application of the present invention, the problem of increasing NOx facing the injector having a group of injection holes can be solved.

As shown in FIG. 7, it is confirmable that the amount of CO generation at the applicable time of the present invention remains static in comparison with the inapplicable time of the present invention.

As described above, the application effects of the present invention was described.

According to the foregoing explanation, in the diesel engine equipped with the injector 1 having a plurality of intersections between the axis line of the injector 1 and the axes of injection holes 10a bored in the injector 1, the air intake valve 25 is controlled to close, at timing before BDC (at timing when the piston comes to the bottom dead center), by the ECU 50, which controls the timing of closing the air intake valve 25, based on operating conditions of the engine.

Accordingly, the intake temperature in the cylinder can be lowered and the combustion temperature can be lowered, due to the effect of intake air adiabatic expansion. The generation of smoke and THC can be also reduced.

The ECU 50 electrically controls the timing of closing the air intake valve 25.

Accordingly, the accurate and detailed valve timing control can be performed, in accordance with operation conditions.

The timing of closing the air intake valve 25 is controlled base on the EGR quantity fed back from the EGR valve 46 to the ECU 50.

Accordingly, the adequate valve timing control can be performed by feeding back the intake air temperature change by the EGR valve 46 to the ECU 50.

The ECU 50 preliminarily memorizes the map information corresponding to the intake volume or the air volume displacement and controls the timing of closing the air intake valve 25, based on the intake volume or the air volume displacement detected by the air flow meter 51 or the supercharger rotation number sensor 52.

Accordingly, the adequate valve timing control can be performed by feeding back the intake air volume to the ECU 50.

Multiple air intake valves 25 are provided per single cylinder, and the respective valves 25a, 25b of them are controlled so that they are closed at different timings by the ECU 50.

Accordingly, the timing, when the effect of intake air adiabatic expansion is acquired, can be expanded, and a detailed valve timing control can be performed.

When the timing of closing the air intake valve 25 is accelerated, the ECU 50 controls the swirl variable valve 47 to increase the swirl ratio.

Thus, the combustion efficiency can be further improved by increasing the swirl ratio, with an increase in the intake air adiabatic expansion quantity.

The ECU 50 controls the timing of closing the air intake valve 25 in response to the charging pressure detected by the charging pressure sensor 53.

Thus, the adequate valve timing control can be performed by relating the intake adiabatic expansion quantity to the charging pressure.

The ECU 50 controls the timing of closing the air intake valve 25 in response to the intake temperature detected by the intake temperature sensor 54.

Thus, the adequate valve timing control can be performed by relating the intake adiabatic expansion quantity to the intake temperature.

The ECU 50 controls the timing of closing the air intake valve 25 in response to the fuel temperature detected by the fuel temperature sensor 55. Thus, the adequate valve timing control can be performed by relating the intake adiabatic expansion quantity to the fuel temperature.

The ECU 50 controls the timing of closing the air intake valve 25 in response to the fuel cetane value detected by the fuel cetane value input portion.

Thus, the adequate valve timing control can be performed by relating the intake adiabatic expansion quantity to the fuel cetane value.

The ECU 50 controls the timing of closing the air intake valve 25 so that it is closed at timing after the BDC (at timing when the piston comes to the bottom dead center), based on any of the detected value of the charging pressure by the charging pressure sensor 53, that of the intake temperature by the intake temperature sensor 54, or that of the fuel temperature by the fuel temperature sensor 55, or alternatively, based on the combination of the respective detected values of the charging pressure, the intake temperature and the fuel temperature.

Accordingly, during the operating conditions that are not suitable to the valve timing control, the valve timing control can be canceled and be automatically switched to the normal control.

INDUSTRIAL APPLICABILITY

The technologies according to the present invention can be widely applicable in the common-rail diesel engine for use in various applications such as ships, automobiles and the like.

The invention claimed is:

1. A method for controlling a valve timing of a common-rail diesel engine equipped with a fuel injection device including an injector having a plurality of intersections between an axis line of the injector and axes of injection holes bored in the injector, wherein the injector injects fuel from the injection holes to a cylinder having an air intake valve configured so that a valve opening timing for opening the air intake valve and a valve closing timing for closing the air intake valve are variable, the method comprising a step of:
controlling the variable valve opening and closing timings of the air intake valve by a valve timing control means based on operating conditions of the engine,
wherein the air intake valve is normally opened at a normal valve opening timing before a piston in the cylinder comes to a top dead center, and is normally closed at a normal valve closing timing after the piston comes to a bottom dead center, so as to have a certain phase difference between the normal valve opening timing and the normal valve closing timing,
wherein the valve timing control means advances the variable valve opening and closing timings of the air intake valve to an advanced valve opening timing and an advanced valve closing timing in accordance with a change of an engine rotation number or a load on the engine so as to close the air intake valve at the advanced valve closing timing before the piston comes to the bottom dead center, and so as to keep the certain phase difference between the advanced valve opening timing and the advanced valve closing timing,
wherein at least one of a detection value of supercharging pressure by a supercharging pressure detecting means, a detection value of intake temperature by a intake temperature detection means, and a detection value of fuel temperature by a fuel temperature detecting means is inputted to the valve timing control means, and
wherein the valve timing control means controls the variable valve opening and closing timings so that the normal valve closing timing after the piston comes to the bottom dead center can be set in accordance with change of the at least one detection value even if the advanced valve closing timing before the piston comes to the bottom dead center should be set in accordance with change of the engine rotation number or load on the engine.

2. The method for controlling the valve timing of the diesel engine as set forth in claim 1, wherein the air intake valve is driven by a camshaft, wherein a cam drive member for driving the camshaft is driven by a drive shaft of the engine, wherein the valve timing control means includes an actuator for changing the variable valve opening and closing timings of the air intake valve, wherein the actuator is interposed between the cam drive member and the camshaft so as to transmit power from the cam drive member to the camshaft, wherein the actuator includes an input member interlocking with the cam drive member includes an output member interlocking with the camshaft, and defines first and second hydraulic fluid chambers between the input member and the output member, and wherein a hydraulic balance between the first and second hydraulic fluid chambers can be changed so as to change a relative phase between the cam drive member and the camshaft, thereby changing the variable valve opening and closing timings.

3. The method for controlling the valve timing of the diesel engine as set forth in claim 1, wherein the variable valve opening and closing timings of the air intake valve are controlled on the basis of recirculation volume of exhaust gas by the valve timing control means, which is connected to an exhaust gas recirculation device.

4. The method for controlling the valve timing of the diesel engine as set forth in claim 1, wherein the variable valve opening and closing timings of the air intake valve are controlled on the basis of an air intake volume or an air exhaust volume, by the valve timing control means, which is connected to an air intake volume detecting means or an air exhaust volume detecting means, and which preliminarily memorizes a map information corresponding to the air intake volume or the air exhaust volume.

5. The method for controlling the valve timing of the diesel engine as set forth in claim 1, wherein the engine has a plurality of cylinders having the respective air intake valves whose variable valve opening and closing timings are controlled by the valve timing control means so that the valve closing timings of the air intake valves of the respective cylinders are different from one another.

6. The method for controlling the valve timing of the diesel engine as set forth in claim 1, wherein the valve timing control means is connected to a swirl ratio control means for changing a variable swirl ratio of fuel injection, and wherein when the variable valve opening and closing timings of the air intake valve are advanced by the valve timing control means, the swirl ratio control means increases the swirl ratio.

7. The method for controlling the valve timing of the diesel engine as set forth in claim 1, wherein the variable valve opening and closing timings of the air intake valve are controlled in accordance with change of a fuel cetane value by the valve timing control means that is connected to a fuel cetane value input means or a fuel cetane value detecting means.

* * * * *